Nov. 12, 1957  MARCEL-GEORGES HENRY  2,812,696
VIBRATORY-TYPE ROAD-ROLLING DEVICE
Filed June 9, 1954  2 Sheets-Sheet 1
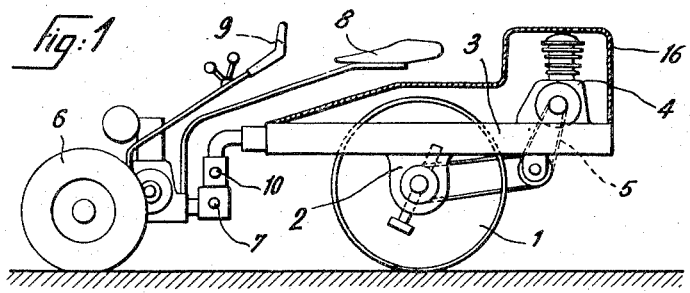
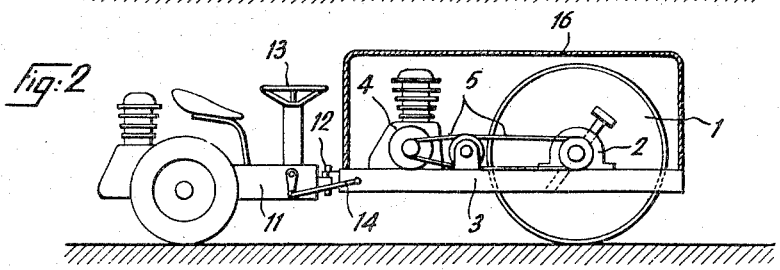
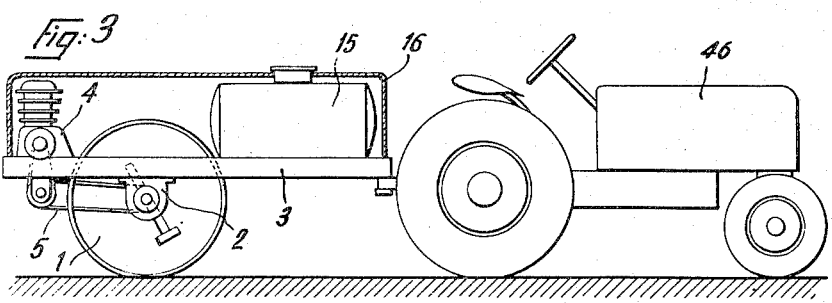
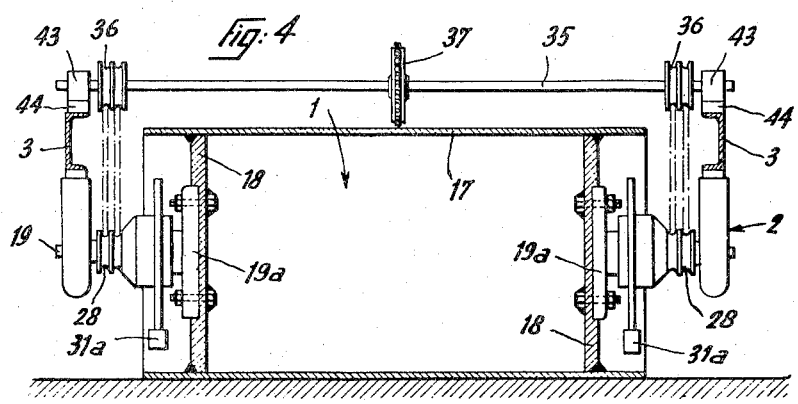
Inventor:
Marcel-Georges Henry
by Robert Henderson
attorney

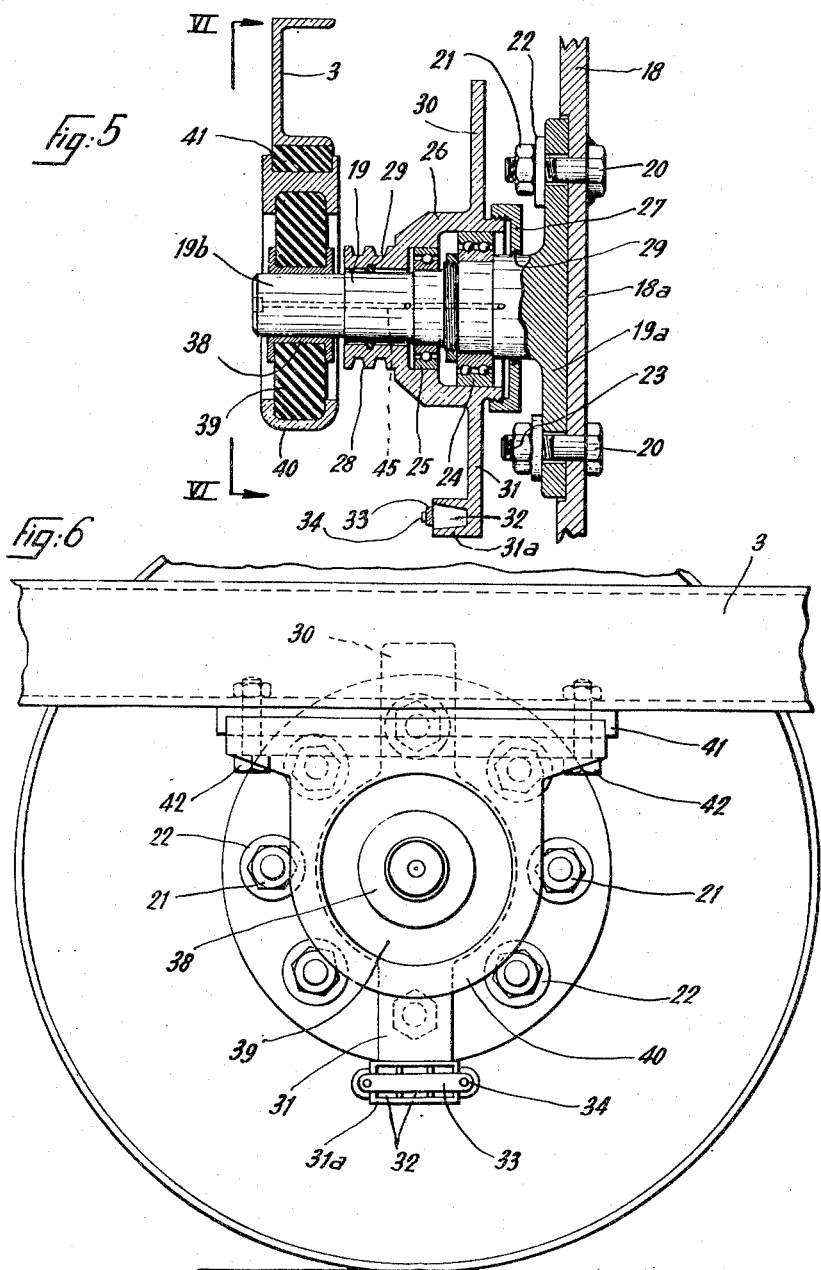

United States Patent Office 2,812,696
Patented Nov. 12, 1957

2,812,696

VIBRATORY-TYPE ROAD-ROLLING DEVICE

Marcel-Georges Henry, Pierrefitte, France, assignor to Etablissements Richier, Societe Anonyme, Charleville, France, a French corporation Application June 9, 1954, Serial No. 435,558

Claims priority, application France May 12, 1954

8 Claims. (Cl. 94—48)

It has already been proposed to increase the effectiveness of road-rollers by setting these rollers in vibration by means of vibrators comprising a rotating out-of-balance weight.

In particular, rollers are already known in which the drum which constitutes the roller is mounted so as to be freely rotatable on a shaft with an out-of-balance weight set in rapid rotation from an external source of motive power. This form of construction has, however, the disadvantage that the bearings on the out-of-balance shaft, which also carry the roller, have to withstand at the same time the effects of the vibration and the rotation of the roller, so that their wear is rapid.

In a further known form of construction, it has been proposed to construct the drum of the roller and its axle in one piece and the extremities of this axle, which are supported by elastic bearings, are set in vibration by out-of-balance vibrators rotating around these extremities.

In this case, the effect of wear or deterioration of the extremities of the shaft or of the drum itself, make it necessary to replace the assembly constituted by the drum and its shaft.

Finally, the known constructions of vibratory road-rollers show only a small relative improvement as compared with non-vibratory rollers, although they are more efficient for equal weight than the latter type. In fact, the coupling of the roller to the member which sets it in vibration is bi-lateral, so that the amplitude of the vibration is limited since the roller simply follows the vibrations which are transmitted to it by the vibrator. In addition the momentary acceleration is, in consequence, at the most equal to those of this vibrator.

The present invention has for its object to effect improvements in vibratory rollers which remedy these drawbacks and increase considerably the efficacy of such rollers.

In accordance with the invention, the drum of the roller is provided at its extremities with two shaft members constituting journals connected to end plates of the drum by shaft end plates which have a certain amount of radial play, the said journals being supported relatively to a chassis in elastic bearings and each of said journals being set in vibration by an out-of-balance vibrator rotating around the said journal.

In a construction of this kind, as each of the journals is independent of the drum, any damage arising to one of these three parts is readily repaired by replacement of the damaged part. In addition, the journals are much more simple to machine than is a complete axle, the length of which is greater than that of the drum portion of the roller.

However, the main advantage of the invention resides in the greatly increased efficiency of this vibratory roller with respect to those of any known construction. In fact, by virtue of the radial play in the connections between the shaft end plates and the roller end plates, each of the journals or shafts hammers the roller, in a way, and the latter, by reason of this radial play, may have an amplitude of vibration greater than that of the journals and, due to the blows which it receives, considerable instantaneous accelerations, accompanied by shock effects.

The out-of-balance vibrators associated with each of the journals are preferably set in vibration by a separate motor, whilst the movement of the roller over the ground is effected by a second motor independent of the first, which is preferably carried by a towing machine independent of the chassis which carries the roller, so that the means of propulsion of the roller and the driver of the machine are completely free from the vibration effect.

The description which will follow below with reference to the attached drawings (which are given by way of example only and not in any sense by way of limitation) will make it quite clear how the invention may be carried into effect, the special features which are brought out, either in the drawings or in the text, being understood to form a part of the said invention.

Figs. 1, 2 and 3 show in elevation three possible forms of embodiment of machines comprising a vibratory roller in accordance with the invention.

Fig. 4 is a vertical cross-section through the axis of a vibratory roller in accordance with the invention.

Fig. 5 is a cross-section enlarged with respect to Fig. 4, of a journal with its roller bearing and its vibrator.

Fig. 6 is an elevation following the line VI—VI of Fig. 5, of the journal shown in this figure.

The machines shown in Figs. 1, 2 and 3 comprise a vibratory roller 1 supported by means of elastic bearings 2 (which are more fully described later) and a chassis 3. This chassis carries in addition, a motor 4 for setting the roller in vibration, which actuates the out-of-balance vibrators through systems of pulleys or chains 5, the vibrators being supported by means of the journals arranged at the extremities of the roller 1, as will be seen later.

In the case of Fig. 1, the roller is propelled by a front-wheel drive 6 to which the chassis 3 is connected by an elastic Cardan joint 7. The driver is placed on the seat 8 and can steer the machine by acting on the one hand upon the steering handle 9 and, on the other hand, on the foot-rests 10 connected elastically to the chassis 3.

In the case of Fig. 2, the roller is pushed along by a rear wheel drive 11 to which the chassis 3 is attached as before by means of an elastic Cardan joint 12. The driving of this vehicle is effected by a steering-wheel 13 which enables the direction of the driving unit to be varied with respect to the chassis 3 through a crank-arm 14.

In the case of Fig. 3, the chassis 3 is attached behind a tractor 46, preferably through an elastic coupling. In this event, and in the case of high-power machines, a water tank 15 may be provided for watering the roller 1 during working. In all three cases, casings 16 may be provided to protect the mechanical parts carried by the chassis 3.

In all these three cases also, flexible transmission devices, preferably of the cable type in sheaths, connect the driver's post to the clutch and to the gas-control handle of the engine 4, which sets the roller in vibration.

Figs. 4, 5 and 6 show a preferred form of embodiment of the vibratory roller in accordance with the invention. The drum or roller member is constituted by a cylinder 17 of heavy sheet steel, closed in at the extremities by roller end plates 18. In these roller end plates are machined cavities 18a in the form of shallow cylinders in which are housed end plates 19a of the journals or shaft members 19; the diameter of the cavity 18a being a little greater than the external diameter of the end plate 19a; for example, there may be provided with advantage a difference in said diameters of the order of half a millimeter between the edge of the end plate 19a and the internal edge of the cavity 18a. The end plates 19a are held in position in cavities 18a by means of bolts 20 secured in holes bored in the roller end plates 18, the heads of said bolts being welded to the internal walls of the roller end plate. The said bolts pass through shaft end plate 19a in holes of greater diameter than that of the bolt-shanks by an amount at least equal to and preferably greater than the play provided for the shaft end plate 19a in the cavity 18a. The mentioned bolts are provided with nuts 21 under the heads of which are fitted washers 22 of anti-friction metal and/or solid rubber (or again of rubber provided with anti-friction linings on its two faces). The nuts 21 are not drawn up sufficiently to tighten the end plate 19a against the bottom of the cavity 18a and they are prevented from becoming loose, for example by means of pins 23. By this means, the drum of the roller is able to move radially with respect to the end plate 19a within small limits.

Each shaft member 19 carries, through the intermediary of ball bearings 24 and 25, a rotating casing 26 which is closed by a screwed-on cover 27 so that it may be amply filled with grease. This grease may be introduced through passages 45. The grease-tightness of this casing is ensured by felt grease-seals 29.

Formed integrally with the casing 26 are, on the one hand, pulleys 28 with trapezoidal grooves and, on the other hand, two diametrically-opposite arms 30 and 31. The arm 30 roughly balances the weight of the arm 31, but the extremity of the latter is provided with a thicker portion 31a in which are formed cavities or weight receptacles 32 each in the form of a truncated pyramid. There may thus be introduced into these cavities (of which there are three in the example shown) one, two or three weights of the same shape as that of the cavities, these weights being, for example made of lead and being held in position in the cavities by a small bar 33 fixed by the screws 34.

As may be seen in Fig. 4, the two pairs of pulleys 28 belonging to the two shaft members are actuated by a common shaft 35 provided at its extremities with pairs of pulleys 36, aligned with the pulleys 28, this shaft being adapted to receive its movement from the motor 4, for example through the medium of a gear-wheel 37.

The extremity 19b of the shaft member is mounted in a smooth bearing 38 which is supported in a piece of rubber 39 or similar material, the latter being mounted in a casing 40 which fits its external toric shape. This casing is fixed on the chassis 3 through the medium of a further rubber block 41 and bolts 42. In the same way, bearings 43 which support the extremities of the shaft 35 are mounted on the same chassis 3 through the medium of blocks of rubber 44.

The arrangement which has just been described operates in the following manner:

The rolling of the drum or roller along the ground under the thrust of the traction of the drive 6 or equivalent propelling means is permitted by the mounting of the ends 19b of the shaft members inside the bearings 38; during this rolling movement, these shaft members are set in vibration by the rapid rotation of the casings 26. The frequency of this vibration depends on the speed of the motor 4, whilst its amplitude is determined by the weight of the blocks introduced into the cavities 32. By reason of this vibration, the shaft end plates 19a, which are free to move radially in cavities 18a, hammer against the edges of said cavity which, on the one hand transmits this vibration to the drum in the form of blows struck at a rapid rate and, on the other hand, enables this drum to have an amplitude of displacement greater than that of the end plates. There are thus obtained crushing effects on the stony material which are extremely effective and which produce either a powdering of these materials or their driving into the ground. By virtue of the double elastic mounting provided by the blocks 39 and 41, only a very small part of this vibratory energy is transmitted to the chassis 3. In addition, by reason of the elastic mounting on the chassis of the vibration-producing members of the roller, these members are protected against vibration to the maximum possible extent.

There is an advantage in giving at the outset the same angular setting for the arms 31 and 32 forming part of the two journals. Thus, the vibrations of the two journals are in step and the shocks transmitted to the roller have the same direction on both sides at the same time. Experience has shown that this setting is almost fully maintained in operation, although the driving pulleys may be liable to slip, provided that the tensioning of the pairs of pulleys is made roughly the same, given that the working conditions at the two extremities of the roller are approximately the same. The roller operates in a satisfactory way, however, if the two out-of-balance weights are angularly displaced with respect to each other.

It will, of course, be understood that modifications may be made to the improved construction which has been described, in particular by the substitution of equivalent technical means, without thereby departing from the spirit or from the scope of the present invention.

What I claim is:

1. A vibratory-type road-rolling device comprising a roller member, a shaft member, mounting means maintaining said roller member and shaft member in approximately coaxial, radially shiftable interrelationship, abutment means, rigid with one of said members, limiting relative radial shifting of said members, and an eccentric weight mounted on said shaft member and rotatable about the latter's axis to vibrate the shaft member.

2. A vibratory-type road-rolling device according to claim 1, said mounting means constraining said shaft member to turn with said roller member.

3. A vibratory-type road-rolling device according to claim 1, said eccentric weight comprising an eccentrically located weight receptacle and a removable retaining member on said receptacle for holding one or more weights in said receptacle.

4. A vibratory-type road-rolling device according to claim 1, further comprising a chassis resiliently supported by said shaft member and a motor, on said chassis, adapted to rotate said weight about said axis of the shaft member.

5. A vibratory-type road-rolling device according to claim 4, said eccentric weight having a hub rigidly associated therewith, said hub being formed with a pulley-groove therein and the device further including a belt driven by said motor and running in said groove to rotate said eccentric weight.

6. A vibratory-type road-rolling device according to claim 1, such a shaft member being provided at each of opposite ends of the roller member, said mounting means comprising, at each end of the roller member, a roller end plate rigid with the roller member, a shaft end plate rigid with one of the shaft members and means for holding said end plates in intimate, face-to-face, approximately coaxial, radially shiftable interrelationship, and said abutment means comprising, at each end of the roller member, a radially inwardly facing cylindrical surface in one of said end plates and a radially outwardly facing cylindrical surface, of less diameter than said inwardly facing cylindrical surface, on the other of said end plates, the two said cylindrical surfaces being in radial alignment and adapted to abut each other to limit radial shifting of the two end plates.

7. A vibratory-type road-rolling device according to claim 6, said means for holding said end plates in face-to-face interrelationship comprising plural bolt and nut assemblies extending through oversize bolt holes in one of said end plates.

8. A vibratory-type road-rolling device according to claim 6, said inwardly facing cylindrical surface partially defining a shallow, concentric, circular recess in said roller end plate and said shaft end plate extending into said recess.

References Cited in the file of this patent

UNITED STATES PATENTS

| | | |
|---|---|---|
| 2,197,183 | Keeler | Apr. 16, 1940 |
| 2,248,478 | Mall | July 8, 1941 |
| 2,671,386 | Kerridge | Mar. 9, 1954 |
| 2,677,995 | Wood | May 11, 1954 |

FOREIGN PATENTS

| | | |
|---|---|---|
| 588,506 | Great Britain | May 27, 1947 |